C. BRAMMING.
ELECTRIC SWITCH.
APPLICATION FILED FEB. 19, 1917.

1,263,344.

Patented Apr. 16, 1918.

Inventor,
Carl Bramming
By _____
Attys.

UNITED STATES PATENT OFFICE.

CARL BRAMMING, OF CHICAGO, ILLINOIS, ASSIGNOR TO ACCESSORIES MANUFACTURING COMPANY, A CORPORATION OF ILLINOIS.

ELECTRIC SWITCH.

1,263,344.  Specification of Letters Patent.  Patented Apr. 16, 1918.

Application filed February 19, 1917. Serial No. 149,630.

*To all whom it may concern:*

Be it known that I, CARL BRAMMING, a citizen of the United States, and resident of Chicago, county of Cook, and State of Illinois, have invented certain new and useful Improvements in Electric Switches, of which the following is a specification, and which are illustrated in the accompanying drawings, forming a part thereof.

The invention relates to improvements in electric switches of the single push button type. The objects of the invention are to secure simplicity of operation and reliability of action in a simple and compact device.

One embodiment of the invention is hereinafter described and is illustrated in the accompanying drawings, in which—

Figure 1 is a side view of the switch;

Figs. 2 and 3 are sectional views on the lines 2—2 and 3—3, respectively;

Figure 1:
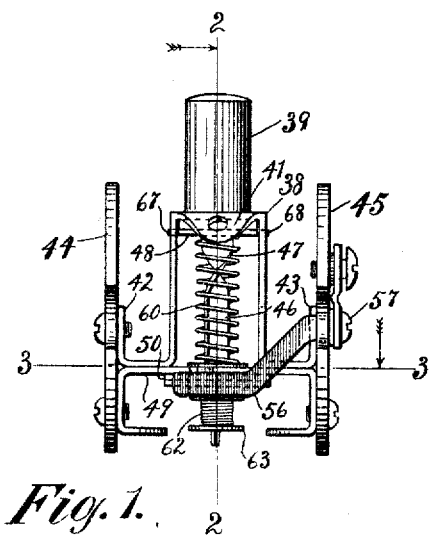
Figure 2:
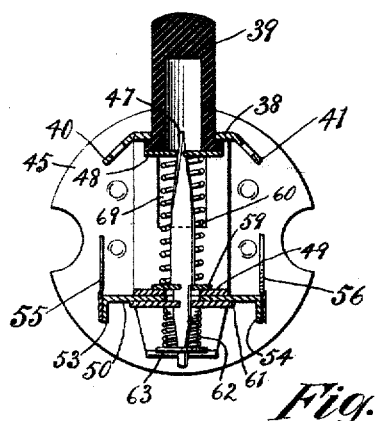
Figure 3:
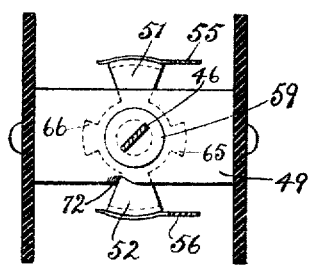
Figure 4:
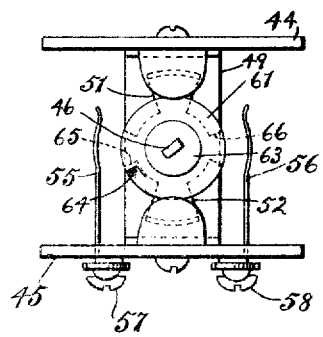
Fig. 4 is an end view of the switch looking at the bottom of Fig. 1.
Figure 5:
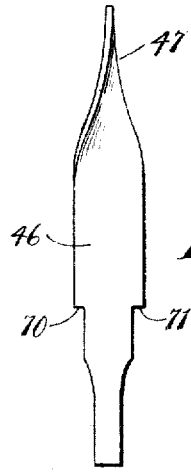
Fig. 5 is a detail of the actuating plunger.

The casing 38 takes the form of a U-shaped plate apertured in its cross-member to receive the push button 39, such member being provided with laterally apertured lugs 40, 41, providing means for securing the switch within a suitable support, the ends of the side members of the plate 38 being bent outwardly and backwardly to form lugs 42, 43, to which are secured a pair of insulating plates 44, 45.

The rod 46 is spiral at its upper end 47, this portion playing within a complementary slot in a plate 48 secured to the inner end of the push button, the lower end of the rod passing loosely through an aperture in a fixed plate 49 secured to the members 44, 45, and loosely through an aperture in a rotatable plate 50 bearing against the lower face of the plate 49 and having a pair of oppositely positioned lugs 51, 52, having down-turned ends 53, 54, adapted to simultaneously engage a pair of spring contact plates 55, 56. The plates 55, 56, are secured to one of the insulating members, as 45, by means of screws 57, 58, which constitute the binding posts for the line terminals.

A wear plate 59 is mounted against the inner face of the plate 49, and a helical spring 60, coiled about the rod 46, reacts between this plate and the plate 48, its function being to return the push button after each inthrust. A wear and actuating plate 61 bears against the lower face of the plate 50, and is yieldingly held in contact therewith by means of a spring 62, reacting against a plate 63 secured to the lower end of the rod. The plate 61 is slotted to engage the rod and turn with it, and is provided with a lug 64 for engaging back of the lugs 51, 52, and a pair of intermediate lugs 65, 66, formed on the plate 50.

The rod 46 is so formed that it oscillates the plate 61 through a quarter of a circle at each impulse of the push button, the plate 50 being carried forward with it, bringing its ends 53, 54, alternately into and out of engagement with the spring contact plates 55, 56. The inthrust of the push button consequently alternately closes and opens the circuit. The plate 48 is provided on its ends with a pair of lugs 67, 68, entering longitudinal slots, as 69, in the side members of the casing 38, whereby turning movement of the plate 48 is prevented.

Longitudinal movement of the rod 46 is prevented by forming thereon a pair of shoulders 70, 71, for engaging the wear plate 59. A detent 72, struck up on the plate 49, is engaged successively by the lugs 51, 66, 52 and 65 as the plate 50 is advanced, and prevents retrograde movement thereof, the plate 50 being permitted to yield slightly by the spring 62 in order that its lugs may advance past this detent.

While a preferred embodiment of the invention is herein shown and described, various changes in the form and arrangement of parts can be made without departing from its scope.

I claim as my invention—

1. In an electric switch, in combination, a pair of terminals, a rotative contact plate coöperating therewith, an oscillatable actuating plate engageable with the contact plate, a rod in non-rotative engagement with the oscillatable plate and having a spiral portion, and a reciprocating part fitting and slidable upon the spiral portion of the rod and means independent of said terminals for preventing reverse movement of the plate.

2. In an electric switch, in combination, an actuating rod, a non-rotative reciprocating element in sliding engagement therewith, one of said elements having a spiral formation, a rotative contact plate, means carried by the rod for interlocking with the plate in one direction only of movement of the rod, a pair of terminals engageable by the contact plate and means independent of said terminals for preventing reverse movement of the plate.

3. In an electric switch, in combination, a non-rotating reciprocating push-button, a spiral plunger rotated thereby without reciprocation, a contact plate rotated intermittently by said spiral plunger, a pair of contacts engageable by the contact plate, said contact plate being constructed to lie entirely out of mechanical contact with said contacts after alternate movements of the plate, and means independent of the contacts for preventing reverse rotation of the contact plate.

4. In an electric switch, in combination, a non-rotating reciprocating push-button, a spiral member rotated thereby without reciprocation, a contact plate rotatable about a central axis, a non-rotatable pawl plate yieldingly pressed against one side of said contact plate adapted to prevent rotation of the latter in one direction, and a pawl plate yieldingly pressed against the other side of said contact plate adapted when oscillated about said axis by said spiral member to rotate the contact plate intermittently in the other direction.

5. In an electric switch, in combination, a non-rotating reciprocating push-button, a spiral member rotated thereby without reciprocation, a contact plate rotatable about a central axis, a pawl plate oscillated by said member about said axis on one side of said contact plate adapted to move the latter intermittently in one direction, and a non-rotatable pawl plate on the other side of said contact plate adapted to prevent movement of the latter in the opposite direction.

CARL BRAMMING.